United States Patent [19]

Stout

[11] Patent Number: 4,730,914
[45] Date of Patent: Mar. 15, 1988

[54] ELONGATE, ARCUATE MIRROR WITH GENERALLY CONVEX SURFACE PORTIONS

[75] Inventor: Thomas R. Stout, Lambertville, Mich.

[73] Assignee: Safety Cross Mirror Co., Inc., Lambertville, Mich.

[21] Appl. No.: 944,564

[22] Filed: Dec. 22, 1986

[51] Int. Cl.$^4$ .............................. G02B 5/10; B60R 1/08
[52] U.S. Cl. ...................................... 350/629; 350/636
[58] Field of Search ................................ 350/629, 636

[56] References Cited

U.S. PATENT DOCUMENTS

| | | | |
|---|---|---|---|
| 3,901,587 | 8/1975 | Haile | 350/629 |
| 4,436,372 | 3/1984 | Schmidt et al. | 350/629 |

FOREIGN PATENT DOCUMENTS 186553  11/1982  Japan .................................. 350/629

*Primary Examiner*—Jon W. Henry
*Attorney, Agent, or Firm*—Allen D. Gutchess, Jr.

[57] ABSTRACT

An elongate, arcuate mirror with generally convex surface portions is provided, particularly for school busses. One of the mirrors is preferably provided at each front corner of the school bus to enable the driver to have visual access to the area in front of the bus hood as well as to the sides of the bus. The mirror has a transparent sheet with a generally convex surface and a generally concave surface with the sheet having a reflective coating on the concave side. The sheet has a constant radius in a longitudinal direction of predetermined value throughout a central portion of the mirror with the central portion being about one-half the peripheral length of the mirror. The sheet has a constant radius of predetermined value in a transverse direction throughout the same central portion of the mirror which exceeds the value of the longitudinal radius. The ends of the sheet beyond the central portion have generally segmental spherical shapes with a radius about equal to the value of the fixed transverse radius. The mirror provides the viewer with a larger reflective view with substantially less distortion than mirrors heretofore known.

20 Claims, 5 Drawing Figures

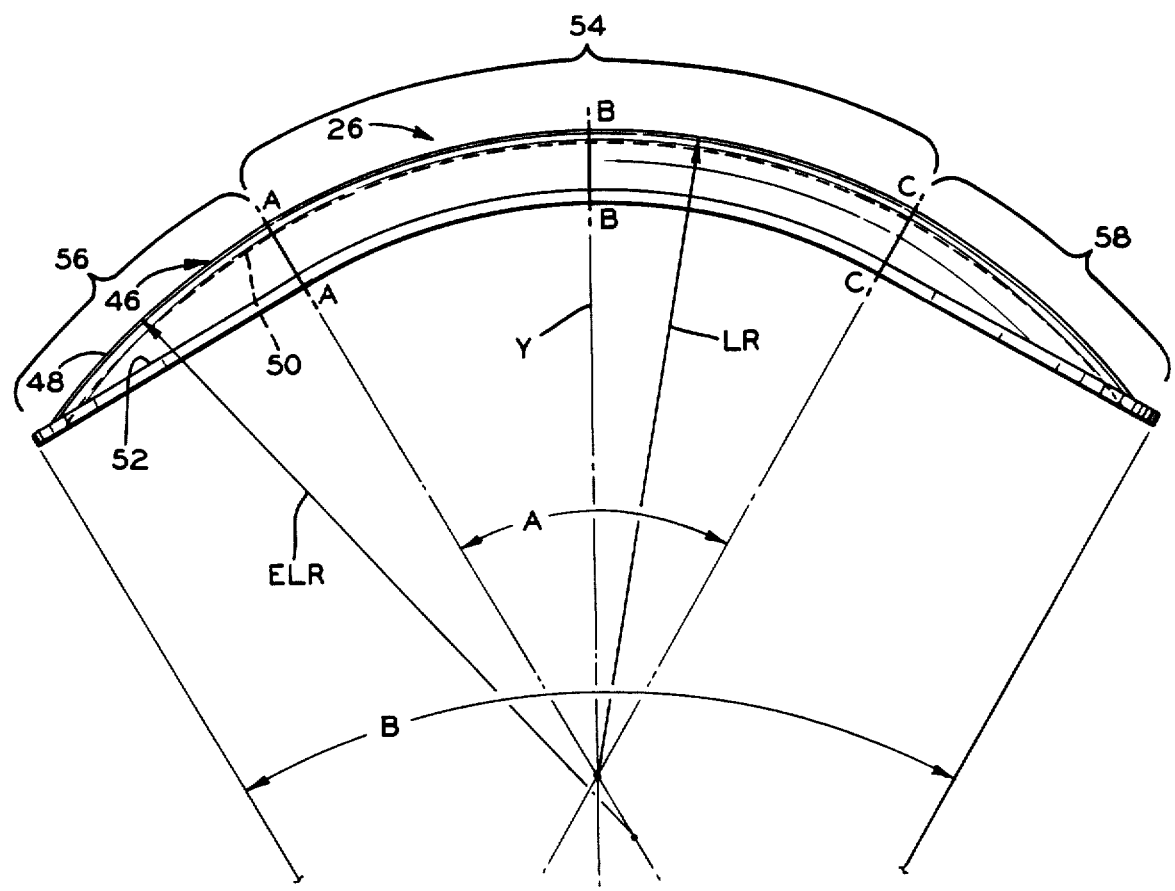
FIG. 3
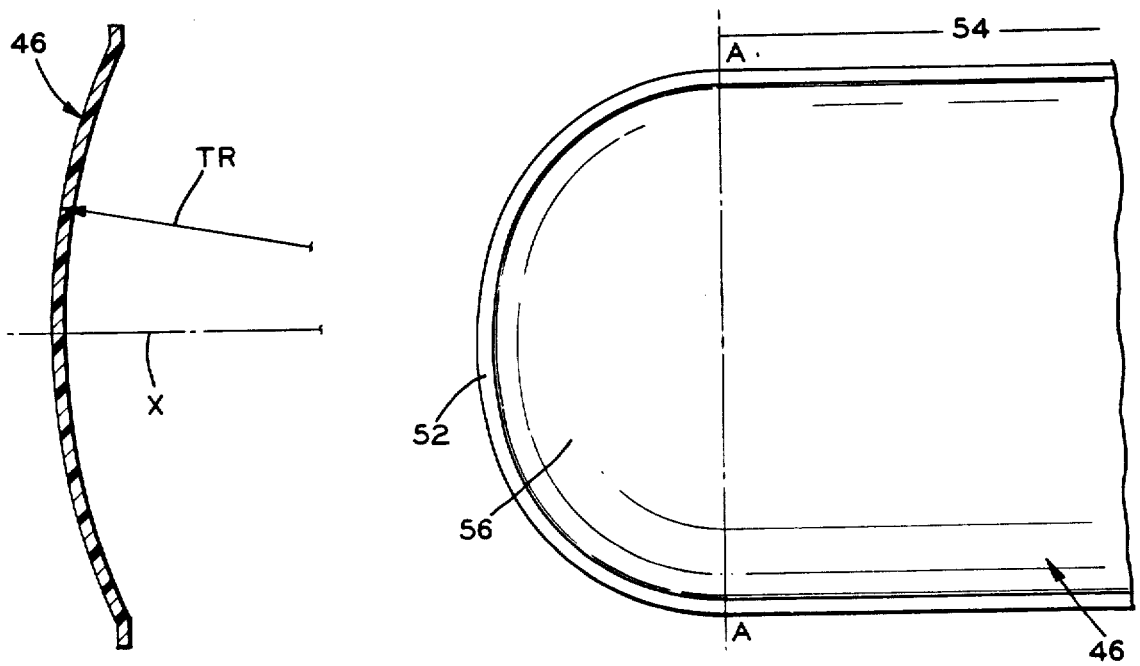
FIG. 4
FIG. 5

ELONGATE, ARCUATE MIRROR WITH GENERALLY CONVEX SURFACE PORTIONS

This invention relates to an elongate, arcuate mirror having generally convex surface portions.

Curved reflective mirrors for vehicles heretofore known are shown in U.S. Pat. No. 1,872,905, issued Aug. 23, 1932; U.S. Pat. No. 1,918,802, issued July 18, 1933; U.S. Pat. No. 2,100,938, issued Nov. 30, 1937; U.S. Pat. No. 4,264,144, issued July 19, 1978; and U.S. Pat. No. 4,436,372, issued Mar. 13, 1984.

The mirror in accordance with the invention is primarily designed for use with school busses but can have other applications where a large reflective view is desired with less distortion. For use with a school bus, one of the mirrors is preferably mounted at each front corner of the bus to provide the driver with visual access to the area in front of the bus which is hidden from direct view as well as to the sides of the bus.

The mirror in accordance with the invention is of elongate, arcuate shape as viewed from the top and has rounded, generally semi-circulate ends as viewed from the front. Portions of the mirror surface as viewed in both longitudinal and transverse cross section are generally convex in shape. The mirror is also symmetrical about a central axis representing the intersection of both longitudinal and transverse planes of symmetry taken through the mirror. A central portion of the mirror, representing about one-half of the peripheral length is curved with a constant longitudinal radius of a predetermined value and a constant transverse radius of a predetermined value which exceeds the longitudinal radius. End portions of the mirror beyond the central portion are of generally segmental spherical shapes, each with a radius about equal to the constant transverse radius. The unique shape of the mirror provides a large, wide-angle reflective viewing area which is accomplished with less distortion than mirrors of a generally similar nature heretofore known.

It is, therefore, a principal object of the invention to provide an elongate, arcuate mirror which achieves a greater reflective viewing area with less distortion.

Another object of the invention is to provide an elongate, arcuate mirror particularly for use with school busses.

Many other objects and advantages of the invention will by apparent from the following detailed description of a preferred embodiment thereof, reference being made to the accompanying drawings, in which:

FIG. 3 is a top view to scale of the mirror of FIG. 2;

FIG. 4 is a view in transverse cross section taken along any of the lines A—A, B—B, and C—C of FIG. 3; and FIG. 5 is a fragmentary front view of the mirror of FIGS. 3 and 4.

Figure 1:
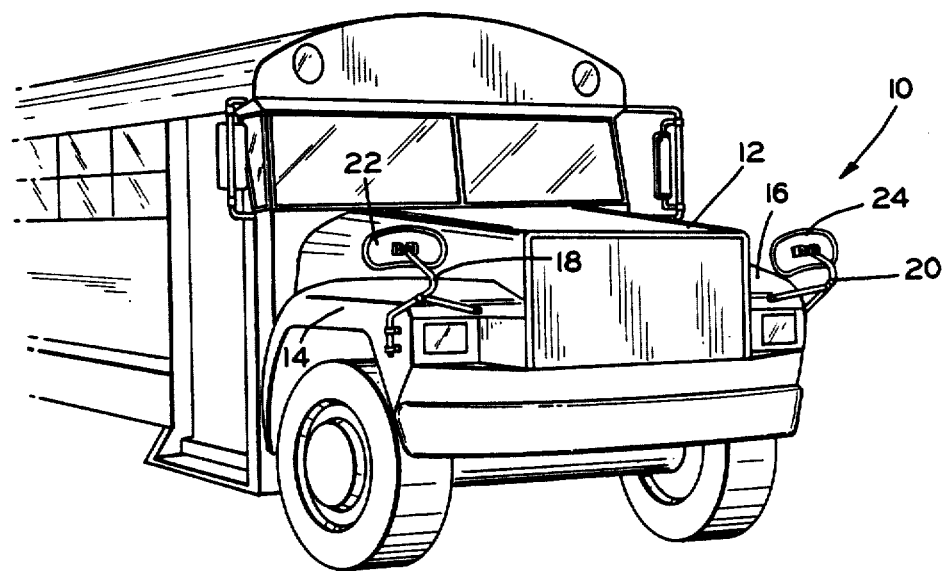
FIG. 1 is a somewhat schematic, fragmentary view in perspective of a school bus on which two mirrors in accordance with the invention are mounted.

Referring to FIG. 1, a school bus indicated at 10 has a hood 12 and front fenders 14 and 16. The hood 12 often causes a large area in front of the school bus to be hidden from direct view of the driver. Heretofore, children have been injured or killed when standing in this area and the bus moves forwardly.

Mirror mounting supports 18 and 20 are mounted on the fenders 14 and 16. These can be similar to those shown in my U.S. Pat. No. 4,512,634, issued Apr. 23, 1985. Elongate, arcuate mirror assemblies 22 and 24 are mounted on the supports 18 and 20 and are positioned so that the driver can see the hidden area in front of the school bus and the areas alongside the school bus clearly and with minimum distortion.

Each of the mirror assemblies 22 and 24 can be similar to one another. The mirror assembly 22 is shown more particularly in FIG. 2 and includes an elongate, arcuate mirror 26 which will be discussed in more detail subsequently. the mirror 26 is mounted in a metal frame 28 having a curved back plate 30 and turned in edges 32. The edges 32 are turned over the edges of the mirror 26 with a suitable vinyl or rubber layer 34 therebetween. Brackets 36 are affixed to the back plate 30 and extend outwardly in parallel relationship where they receive a bolt 38 which also extends through a tubular portion 40 of a mounting bracket 42. The bracket 42 has a hole 44 which receives bolt or the like affixing the mirror 22 to an upper end of the mounting support 18 or 20. This arrangement enables the mirror to be pivoted vertically about the bolt 38 and horizontally about the fastener extending through the hole 44. Complete adjustment of the mirror can thereby be obtained to accommodate the particular school bus and driver.

Figure 2:
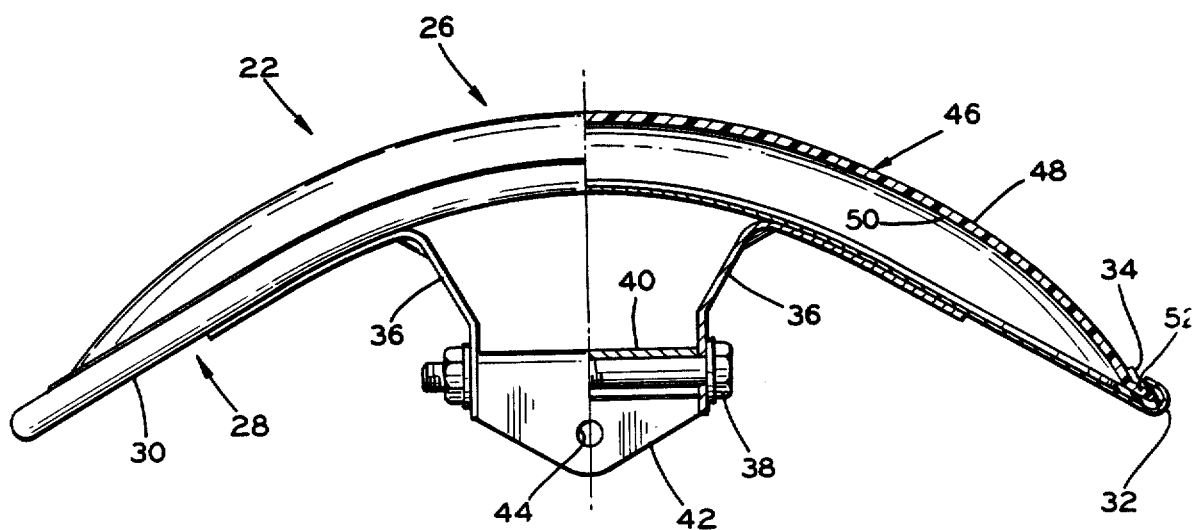
FIG. 2 is an enlarged top view, with parts broken away and with parts in section, of a mirror in accordance with the invention mounted in a frame having a mounting bracket.

Referring to FIGS. 2 and 3, the mirror 26 is comprised of a transparent sheet 46 preferably of suitable plastic material, such as an acrylic, with a thickness in the order of one-eighth inch. The sheet 46 has an outer generally convex surface 48 and an inner generally concave surface 50. The latter has a layer of a suitable reflective material with a protective coating of paint or the like applied over the back of that. The sheet 46 has a rim 52 extending therearound to be received in the mounting frame 28. As viewed from the front in FIG. 5, the rim is straight throughout a substantial central portion of the mirror 26 and has generally semi-circular end portions beyond the central portion.

The mirror is symmetrical about a horizontal or longitudinal plane indicated at X in FIG. 4 and about a vertical or transverse plane indicated at Y in FIG. 3. The mirror is also symmetrical in all respects to a line representing the intersection of the planes X and Y. The mirror has a central portion indicated at 54 which is centrally located and extends from about forty percent to about sixty percent, preferably about one-half of the overall peripheral length of the mirror as viewed in FIG. 3. This central portion 54 also is defined by an included angle A of about fifty to about seventy degrees, as viewed in FIG. 3. The central portion 54 has a substantially constant longitudinal radius of a predetermined value throughout the length thereof, this radius being designated LR in FIG. 3. The central portion 54 also has a substantially constant transverse radius of a predetermined value which exceeds the value of the longitudinal radius, the transverse radius being designated TR in FIG. 4. As shown by the cross section in FIG. 4, the central portion 54 is of the same cross-sectional shape from one end portion to the other. The rim 52 of the central portion 54 also is of a substantially constant radius throughout its length, as viewed from the top.

The mirror 26 also has two end portions 56 and 58 beyond the central portion 54. Each of the end portions 56 and 58 has a longitudinal radius designated ELR in FIG. 3 which is equal to the transverse radius TR, the latter radius being the same value for the end portions 56 and 58 as for the central portion 54. As such, the end portions 56 and 58 have the same longitudinal and transverse radii, rendering the end portions of substantially segmental spherical shape. The center of the end portion longitudinal radius LR is on a line perpendicular to the surface at the adjacent end of the central portion 54, which line also extends through the center of the longitudinal radius LR, as illustrated in FIG. 3. This center is in the plane of symmetry X but offset from the plane of symmetry Y. The edges or rims 52 of the end portions 56 and 58 are straight, extending perpendicularly to the longitudinal radius LR at the extremities of the central portion 54. Each of the rims 52 of the end portions 56 and 58 also lies in a common plane.

The specific mirror 26 illustrated in FIGS. 3–5 will now be discussed in connection with specific values for various dimensions. In this particular instance, the central portion 54 extends through an arc or included angle of sixty degrees from the center of the longitudinal radius LR, with that radius having a fixed value of 9.0 inches. The transverse radius TR throughout the extent of the central portion 54 has a radius exceeding the radius LR and specifically being 10.0 inches. The same radius TR of 10.0 inches also is true for the transverse radii of the end portions 56 and 58. The longitudinal radii ELR of the end portions 56 and 58 are also 10.0 inches, equal to the radius TR, so that the end portions 56 and 58 have transverse and longitudinal radii of 10.0 inches rendering the end portions of substantially segmental convex spherical shape. The radii TR and ELR, however, do not have exactly the same centers, the center of the radius TR being on the intersecting line of the planes X and Y but the center of the radius ELR being offset slightly from that line.

The specific mirror 26 also has an overall peripheral length taken along the longitudinal center at the intersection with the plane X of about seventeen inches, with the center portion 54 having a length of about nine inches and the end portions 56 and 58 having a total peripheral length at the intersection with the plane X of about eight inches. The width of the mirror along the periphery at the intersection with the plane Y is about eight and one-half inches. The overall length of the mirror also defines an included angle B of sixty degrees with the radius of about fifteen inches.

The overall peripheral length of the mirror 26 can be from about ten inches to about twenty-five inches. A smaller mirror produces excessively small images while a larger mirror is heavier and causes greater wind resistance when the bus is moving.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. An elongate, convex mirror comprising a transparent sheet with a convex surface and a concave surface, said sheet having a reflective layer on the concave surface, said sheet having a substantially constant longitudinal radius of predetermined value throughout a central portion of said mirror, said sheet having a substantially constant transverse radius of a value exceeding the value of said longitudinal radius throughout the same central portion of said mirror, end portions of said sheet beyond said central portion to the ends thereof having generally segmental spherical shapes, said mirror being symmetrical about a longitudinal plane taken centrally through said mirror.

2. An elongate, convex mirror according to claim 1 characterized by said central portion of said mirror being from about forty percent to about sixty percent of the length of the mirror.

3. An elongate, convex mirror according to claim 2 characterized by said central portion being about one-half the length of the mirror.

4. An elongate, convex mirror according to claim 1 characterized by said end portions of said sheet having transverse and longitudinal radii about equal to the value of said constant transverse radius.

5. An elongate, convex mirror according to claim 1 characterized by said transparent sheet having a rim around the entire periphery thereof, said rim, as viewed from the top of the sheet, being arcuate with a constant radius substantially throughout the central portion of said sheet, and said rim, as viewed from the top of the sheet, being straight at both end portions of said sheet.

6. A mirror according to claim 5 characterized by said rim at each end portion lying in a common plane.

7. An elongate, convex mirror according to claim 1 characterized by the length of said mirror defining an included angle of about sixty degrees.

8. An elongate, convex mirror comprising a transparent sheet with a convex surface and a concave surface, said sheet having a reflective layer on the concave surface, said sheet having a substantially constant longitudinal radius of a predetermined value throughout a central portion of said sheet defining a central included angle of about fifty degrees to about seventy degrees, said sheet having a substantially constant transverse radius of a predetermined value which exceeds the value of said longitudinal radius throughout the same portion of said sheet, end portions of said sheet beyond said central portion to both ends of said sheet having a longitudinal radius substantially equal to the value of said constant transverse radius and having a transverse radius substantially equal to the value of said constant transverse radius.

9. An elongate, convex mirror according to claim 8 characterized by said central included angle being about sixty degrees.

10. An elongate, convex mirror according to claim 8 characterized by said end portions of said sheet having generally segmental spherical shapes.

11. An elongate, convex mirror according to claim 8 characterized by said transparent sheet having a rim around the entire periphery thereof, said rim, as viewed from the top of the sheet, being arcuate with a constant radius substantially throughout the central portion of said sheet, and said rim, as viewed from the top of the sheet, being straight at both end portions of said sheet.

12. A mirror according to claim 11 characterized by said rim at each end portion lying in a common plane.

13. An elongate, convex mirror according to claim 8 characterized by the length of said mirror defining an included angle of about sixty degrees.

14. An elongate, convex mirror according to claim 11 characterized by a mirror frame having a back plate conforming to the shape of said rim, said back plate having edge portions turned in over said rim, and bracket means affixed to said back plate and enabling adjustable movement of said mirror in an arcuate vertical direction and in an arcuate horizontal direction.

15. An elongate, arcuate, convex mirror comprising a transparent sheet having a convex surface and a concave surface, said sheet having a layer of reflective material on the concave surface, said sheet having a longitudinal radius of about nine inches through a central included angle of about sixty degrees, said sheet having a transverse rdaius of about ten inches throughout the same central included angle of about sixty degrees, end portions of said sheet, beyond the central included angle, to the ends of said sheet having a longitudinal radius of about ten inches, and a transverse radius of about ten inches.

16. A mirror according to claim 15 characterized by the entire length of said sheet defining an included angle of about sixty degrees with a radius of about fifteen inches.

17. A mirror according to claim 15 characterized by the center of the end longitudinal radius lying on a line which is perpendicular to the sheet at the extremities of the central sixty degree included angle and extends through the center of said longitudinal radius, the latter lying in a plane of symmetry through the longitudinal extent of said sheet.

18. An elongate, convex mirror according to claim 15 characterized by said transparent sheet having a rim around the entire periphery thereof, said rim, as viewed from the top of the sheet, being arcuate with a constant radius substantially through the central portion of said sheet, and said rim, as viewed from the top of the sheet, being straight at both end portions of said sheet.

19. A mirror according to claim 18 characterized by said rim at each end portion lying in a common plane.

20. An elongate, convex mirror according to claim 18 characterized by a mirror frame having a back plate conforming to the shape of said rim, said back plate having edge portions turned in over said rim, and bracket means affixed to said back plate and enabling adjustable movement of said mirror in an arcuate vertical direction and in an arcuate horizontal direction.

* * * * *

UNITED STATES PATENT AND TRADEMARK OFFICE
CERTIFICATE OF CORRECTION

PATENT NO. : 4,730,914

DATED : March 15, 1988

INVENTOR(S) : Thomas R. Stout

It is certified that error appears in the above-identified patent and that said Letters Patent is hereby corrected as shown below:

Column 1, line 23, "semi-circulate" should be --semi-circular--.

Column 2, line 15, "the" should be --The--.

Column 2, line 23, "receives bolt" should be --receives a bolt--.

Column 3, line 48, "the" should be --a--.

Signed and Sealed this

Fifth Day of July, 1988

*Attest:*

DONALD J. QUIGG

*Attesting Officer*  *Commissioner of Patents and Trademarks*